United States Patent
Kliger

(10) Patent No.: US 7,961,861 B2
(45) Date of Patent: *Jun. 14, 2011

(54) TELEPHONE SEARCH SUPPORTED BY RESPONSE LOCATION ADVERTISING

(75) Inventor: Scott A. Kliger, Franklin, MI (US)

(73) Assignee: Jingle Networks, Inc., Burlington, MA (US)

( * ) Notice: Subject to any disclaimer, the term of this patent is extended or adjusted under 35 U.S.C. 154(b) by 1302 days.

This patent is subject to a terminal disclaimer.

(21) Appl. No.: 11/289,766

(22) Filed: Nov. 29, 2005

(65) Prior Publication Data

US 2006/0173827 A1 Aug. 3, 2006

Related U.S. Application Data

(60) Provisional application No. 60/631,463, filed on Nov. 29, 2004.

(51) Int. Cl.
H04M 3/42 (2006.01)

(52) U.S. Cl. ......... 379/201.01; 379/211.02; 379/218.01; 705/10

(58) Field of Classification Search ............ 379/201.01, 379/211.02, 218.01; 705/10
See application file for complete search history.

(56) References Cited

U.S. PATENT DOCUMENTS

| | | |
|---|---|---|
| 4,850,007 A | 7/1989 | Marino et al. |
| 5,231,740 A | 8/1993 | Mohebkhosravi |
| 5,448,625 A | 9/1995 | Lederman |
| 5,479,491 A | 12/1995 | Herrero Garcia et al. |
| 5,539,809 A | 7/1996 | Mayer et al. |
| 5,557,658 A | 9/1996 | Gregorek et al. |
| 5,724,521 A | 3/1998 | Dedrick |
| 5,794,210 A | 8/1998 | Goldhaber et al. |
| 5,852,775 A | 12/1998 | Hidary |
| 5,937,037 A | 8/1999 | Kamel et al. |
| 6,009,150 A | 12/1999 | Kamel |

(Continued)

FOREIGN PATENT DOCUMENTS

WO WO2006/037218 * 4/2005

OTHER PUBLICATIONS

"IBM Directory Assistance System Gateway Processor User Guide", © International Business Machines Corporation, Sep. 1987, 34 pages.

*Primary Examiner* — Quynh H Nguyen
(74) *Attorney, Agent, or Firm* — Hamilton, Brook, Smith & Reynolds, P.C.

(57) ABSTRACT

A platform for the delivery of dynamic, interactive audio advertisements played in response to a consumer initiated request for information via a telephone. The platform invention provides advertising supported information services that are related to a geographic location associated with a response to a consumer initiated request. In one specific embodiment, at a customer station, a consumer dials an information access number and is connected to a call processing system. The call processing system receives a request for information from the consumer, and determines a response. The response is then further processed to determine a geographic location associated with the response. An advertisement is then selected that is associated with the geographic location of the response (as opposed to the geographic location specified in request, or as opposed to the geographic location of the consumer, which may not necessarily be the same).

25 Claims, 5 Drawing Sheets

U.S. PATENT DOCUMENTS

| | | |
|---|---|---|
| 6,118,862 A | 9/2000 | Dorfman et al. |
| 6,178,231 B1 | 1/2001 | Nabkel |
| 6,212,262 B1 | 4/2001 | Kamel |
| 6,269,337 B1 | 7/2001 | Desmond et al. |
| 6,301,342 B1 | 10/2001 | Ander et al. |
| 6,385,308 B1 | 5/2002 | Cohen et al. |
| 6,493,437 B1 | 12/2002 | Olshansky |
| 6,570,974 B1 * | 5/2003 | Gerszberg et al. ....... 379/218.01 |
| 6,601,041 B1 | 7/2003 | Brown et al. |
| 6,603,844 B1 | 8/2003 | Chavez, Jr. et al. |
| 6,647,257 B2 | 11/2003 | Owensby |
| 6,937,708 B2 | 8/2005 | Hirose |
| 6,947,531 B1 | 9/2005 | Lewis et al. |
| 7,158,621 B2 * | 1/2007 | Bayne ...................... 379/114.13 |
| 7,596,218 B2 | 9/2009 | Montemer |
| 2004/0186778 A1 * | 9/2004 | Margiloff et al. ............... 705/14 |
| 2006/0004627 A1 * | 1/2006 | Baluja ............................. 705/14 |
| 2007/0127650 A1 * | 6/2007 | Altberg et al. ........... 379/114.13 |

* cited by examiner

TELEPHONE SEARCH SUPPORTED BY RESPONSE LOCATION ADVERTISING

RELATED APPLICATION(S)

This application claims the benefit of U.S. Provisional Application No. 60/631,463, filed on Nov. 29, 2004. The entire teachings of the above application(s) are incorporated herein by reference.

BACKGROUND OF THE INVENTION

Telephone directory assistance continues to be an extremely important service for consumers and businesses. It is estimated that in 2004 there will be approximately 8 billion telephone calls placed to directory assistance services (i.e., 411, 555-1212) in the United States. The average cost billed for these calls is now in excess of $1.00.

Directory assistance services are thus an enormous revenue center for both wired and wireless carriers, with profit margins rumored to be in the 90% range. Nearly all directory assistance calls which are placed by consumers are those looking for a phone number for a specific business or individual that could traditionally be found manually in the "white pages".

To date there is truly no comprehensive telephone based directory assistance available. In particular, consumers may be looking for a business for which they know a category (i.e., plumber, lawyer, travel agent, taxi, etc.) but for which they do not know a name and/or location. There is also no way for a consumer to use a telephone to search by "keyword" for a product or service they wish to purchase. These types of searches are still reserved for consumers to use traditional sources such as the "yellow pages." Increasingly now, consumers can also turn to internet based on line directories and search engines for this type of search.

However, such directory searches often tend to be local in nature, meaning that the consumer is actually looking for a merchant in their immediate geographic area. It is this reality which has driven the two largest internet search engine advertising platforms, Google and Overture (a Yahoo! subsidiary), to recently launch localized advertising options for their so called Cost Per Click (CPC) based advertising services.

There has recently, of course, been much attention paid to online keyword search market. Yahoo's acquisition of Overture in July 2003 for $1.6 billion has led to a doubling of Yahoo's market capitalization, recently at $15 billion. Google's Initial Public Offering (IPO) in August 2004 valued the company at over $23 billion. Almost all of Google's revenue is derived from their "AdWords" paid search product. Both Microsoft and AOL are aggressively entering the marketplace with their own online search solutions. Current estimates are that online paid keyword search market will reach $5.5 billion in 2009.

But the reality is that of the 13 million small to medium size businesses in the United States, fewer than 300,000 of them advertise using web based services (see Jupiter Research, Pay Per Call Survey, March, 2004). The reasons for this are many, but include at least the fact that in order to advertise successfully online, a business must have both a viable website presence as well as the technical infrastructure to be able to handle the leads they receive, typically via e-mail. Furthermore, businesses need to have technical savvy in order to be able to create and manage one or more paid search campaigns. Perhaps it is for these reasons alone that businesses spent 46% of their advertising budget on yellow pages ads but only about 3% for internet search advertising.

While a cottage industry of search engine marketing companies has developed in order to bring more and more businesses online with paid search, the reality is that the majority of businesses are left out. Other reasons for this include the fact that because of the global nature of the internet, paid keyword search is the more effective for products and services which do not require contact with a local market. Furthermore, because of the bidding process for placement of paid advertisements, may small businesses are "squeezed out" of the internet search market by large national players who can afford to pay more in order to capture online leads.

The majority of small businesses thus still rely primarily on the telephone as their primary means of generating sales leads. In an era where personal video recorders threaten to alter the landscape of television advertising, commercial free satellite radio systems limit the effectiveness of local radio advertising, and the national "Do Not Call List" has effectively eliminated traditional telemarketing, merchants and service providers looking to market themselves locally are actually becoming more limited in their choices.

SUMMARY OF THE INVENTION

The present invention is a technology platform for the delivery of dynamically targeted, and even interactive, audio advertisements which may be played in response to a consumer initiated request for information via a telephone. More specifically, the invention provides advertising supported information services that are related to a geographic location associated with a response to the consumer initiated request.

In one specific embodiment, at a customer station, a consumer dials an information access telephone number and a call is connected to a call processing system. The call processing system then receives a request for information from the consumer, and determines a response thereto. The response is then further examined to determine a geographic location associated with the response. An advertisement is then selected that is associated with the geographic location of the response (as opposed to the geographic location specified in request, or as opposed to the geographic location of the consumer, which may not necessarily be the same).

The geographic location associated with the response may be determined from a telephone number associated with the response; one or more parts of an address such as a city, state, country, or postal code; or a latitude and longitude with a surrounding radius.

The advertisement may be identified by query to a database using the geographic location as a query parameter.

Several different criteria may be used in selecting from multiple ads that may be returned from the query. These can include maximizing advertising revenue, consumer satisfaction ratings, ranking of consumer offers, round robin selection, or the like.

The selected advertisement can be retrieved as a stored audio file, a text file that is automatically converted to audible speech, or a text file that is displayed and read back to the consumer by a live operator.

The nature of the telephone yields a robust set of advertisement targeting options. These include:

the specific consumer request (similar to an internet keyword), a geographic location associated with a response to the request, general location information determined by Automatic Number Identifier (ANI) lookup of the calling party, specific location information from, for example, emergency 911 location data available from wireless systems, demographic and/or consumer information obtained by ANI lookup in combination with other databases, behavioral information based on past requests from a particular consumer, or other criteria, such as time of day, day of week, etc.

Using these and other criteria, the platform can be designed to deliver the most suitable audio advertisement in response to the consumer's request in real time.

In addition, audio advertisements provide for a level of interactivity which enables a new set of functions between advertisers and consumers. The platform can thus be used for a number of novel services.

As one example, a Pay Per Call (PPC) service can be provided that supports a "free to consumer," telephone based yellow pages type directory search. Advertisers will be attracted to this service because they will only be charged if a consumer actually reaches them in order to inquire or purchase their products or services. Unlike an internet search, in which a consumer is typically researching only a future potential purchase, a yellow pages search is typically conducted when a consumer is serious about making a purchase. Therefore, these leads tend to be quite valuable to advertisers. Also, unlike internet based pay per click advertising, which is limited to technology savvy advertisers and service providers who have a website, the invention provides a service that can be made available to any merchant familiar with telephones.

Because the consumer doing a yellow pages type search has almost always made a decision to purchase prior to engaging such a search, calls generated from a telephone based yellow pages search can be quite valuable. A minimum cost per call can thus be greater than the cost of directory service and supported by advertisers. The actual amount charged can depend upon the competitiveness of the marketplace and the actual value of the consumer lead for a specific category or keyword. The amounts could be as high or higher, in some instances, as valuable pay per click keywords on the internet.

Another unique feature of the platform is its ability to find a business by either a category or set of keywords provided by the advertiser. This bridges a gap which exists on the internet with traditional search services, like Google, that find results by keyword, versus online yellow pages which typically organize results by category. This further capability allows a consumer to search for a specific product such as "electric scooter" and receive listings which are in both the "bicycle shop" category and the "toy shop" category.

The platform can also implement an advertising supported, "free to consumers" white pages directory assistance. When applied to yellow pages or business directory search, directory assistance as implemented with the invention can be one of the best available ways to deliver an advertising message. The unique nature of the telephone combined with capabilities of the platform, make it possible to deliver targeted interactive advertising messages. Also, because of an integrated reverse ANI lookup, an advertiser knows exactly with whom they are communicating, unlike any other medium.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
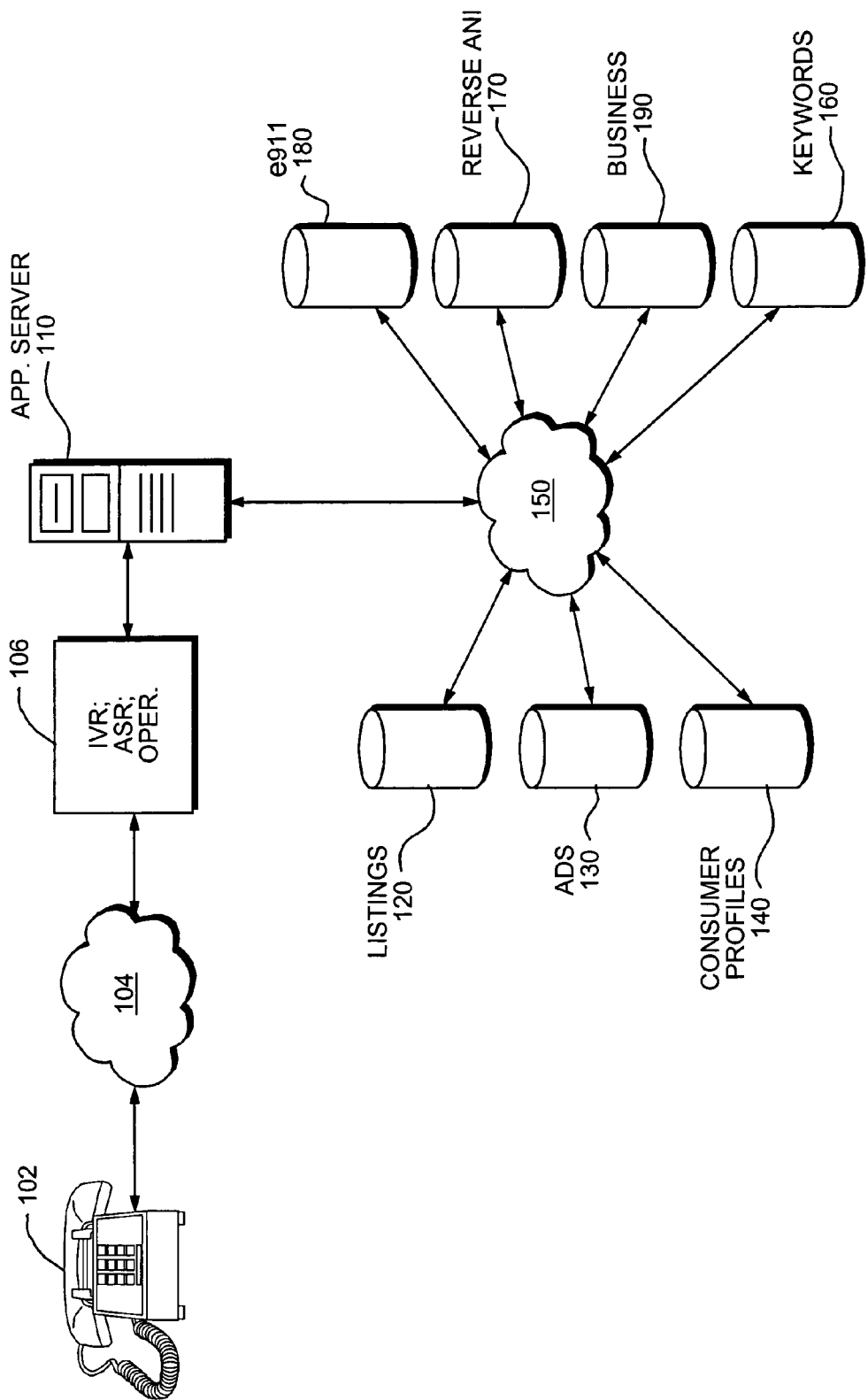
FIG. 1 is a high level diagram of a system that delivers dynamically targeted audio advertisements in response to a consumer initiated request for information.

Now to describe technical aspects of one preferred embodiment of the invention. With reference to FIG. 1, the invention can be implemented using an application server 110 which can receive information originating from a Public Switched Telephone Network (PSTN) 104, specifically via a call originating from a consumer who is using a telephone 102.

The server 110 can receive information requests as data in many ways. In one preferred arrangement, the information is provided via an Interactive Voice Response (IVR)/Automated Voice Recognition (AVR) system 106. The IVR portion of system 106 has some type of interface to obtain a search request from the user, and provide the request as data. For example, the information request can be provided in data form via a keypad (Dual Tone Multi-Frequency (DTMF) digits), by voice recognition software that recognizes speech, and/or via a live operator who speaks to the consumer live and then keys in the request as text. The AVR portion of system 106 provided automatic recognition of the voice signals provided by the consumer.

The application server 110 is connected through the internet 150 (and/or local networks) to various other databases and/or information servers. These include, for example, a listings database 120, an ad server 130, a consumer profile database 140, a keyword database 160, a reverse Automatic Number Identifier (ANI) database 170, an emergency 911 number look-up database 180, a business listings database 190 and other possible paid-subscription or free services or databases. FIG. 1 should be considered a logical view of the various databases; that is, although the drawings illustrates these databases as individual discrete entities each having their own server, it should be understood that one, several, or all of the databases may be consolidated in one physical machine, or that one or more of the databases may be so large as to be distributed among multiple servers and physical processors and/or disk drives.

In general, the application server 110 crafts a search query from the information supplied by the consumer via the telephone 102. The information is then packaged as part of a search query submitted to the private listings database 120. The listings 120 database contains information concerning advertisers who have paid a fee to be listed in the system or agreed to pay for each call which is directed to them as the result of a consumer inquiry.

A successful query in the listings database 120 identifies one or more ads associated with one or more advertisers. As will be understood shortly, if multiple ads are identified in response to the query, then, typically one is identified as the selected ad to he played, based on a number of criteria such as which advertiser bid the most for the ad, or which advertiser provides the best offer to the consumer, etc. The identified ad is then retrieved from an advertising server 130 advertising messages. The consumer then hears the advertising message(s) in response to her search request.

The ads may be stored as digitally encoded audio files (MP3, WAV, etc.) or as text files. In the case of digitally encoded audio file, they are played back to the consumer 102 as an audio signal. However, if stored as a text file, they may first be processed through text to speech (TTS) equipment in the IVR system 106.

The application server 110 can also access a business database 190 which may be hosted by another service provider, for example as a paid service, to locate information that is not in the listings database 120. The business database query 190 can be used, for example, to provide general information listings responsive to the user's request. As for the case of the listings database 120, the location of the caller can be determined by making a query to the reverse ANI database 170 prior to querying the listings database 120. (Please note that the standard ANI service provides information concerning the calling parties' telephone number, such as might also be determined from the phone number portion of a "caller ID" determination, although ANI is not the same service as caller ID in the United States.)

For example, if the search request comes in on a particular telephone number, that telephone number can then be used to obtain a location of the calling telephone 102. This location can then be combined with the category of the search request as a submission to the listings 120 database.

Also note that the listings database 120 is not necessarily limited to just having a list of businesses as grouped into categories by a local telephone exchange service provider. For example, custom groupings may be determined by the system provider, such as by grouping businesses by their telephone number, or other combinations without regard to specific, predefined business or services categories.

Another database that may be kept is a keywords database 160. As will be understood below, the keywords database is used to further refine selection of an advertisement when the consumer's initial request does not map directly to a listing and/or category in the listings 120 and/or business database 190. The keywords database 160 may be located several different places, such as a separate database 160, or it may be part of the listings 120 or business database 190, or part of the server 110 itself.

Further information may be maintained in a consumer profile database 140 that is kept on a per telephone number basis. Such information may include, but is not limited to, data indicating past queries and responses to those inquires. It should be understood that other identifiers may be used to specify a particular individual consumer. For example, the system may keep data on a home phone number, a mobile phone number, and an office phone number together with a unique identifier for the individual. This may also be beneficial as many people now use more than one number.

The service provider operating application server 110 may thus typically develop its own listings database 120 that are paid listings. The paid listings may be categorized by and/or prioritized by highest bid, proximity to the caller or any one of a number of different criteria supported by the system. A listings query can also be satisfied by a random search, a geography match, matching an advertiser willing to pay the most to reach a caller of indicated type previous positive consumer feedback or other criteria. Various partial and/or weighted combinations of these factors may also be used in determining the ads to be played back.

The platform provides a number of unique services including:
    telephone based information search with pay per call listings;
    interactive consumer response to audio advertisements;
    audio advertisements selected in response to a consumer-initiated request for information, where the selection of a specific advertisement is based on several possible criteria including:
        geographic location associated with the request or response;
        previous requests from a particular consumer; or
        keywords contained within the request that may not necessarily match standard goods and services categories Examples of these types of services will now be described in greater detail.

1. General Automated Directory Information (411) Type Services.

The following exchange between a consumer (C) using telephone 102 and the application server (S) 110 is a general example of an exchange where the consumer is obtaining assistance to obtain a yellow pages listing without being charged for the call. The consumer needs a dentist in this example.

S: "Please tell me the service you are looking for".
C: "I need a dentist".

At this point the system performs the above indicated search of the number lookup and listing databases 170 and 120 to locate dentists in the immediate area located adjacent to the consumer. For example, suppose the consumer's telephone 102 number was identified as being in Boulder, Colo. by a query to the reverse number lookup database 120. The application server 110 then searches its listings database 120 to locate a paid advertiser in Boulder in the "Dentist" category. The consumer then hears the following ad retrieved from ad database 130:

S: "Boulder Dental Care. If you would like to be connected to this listing press, the # key. Otherwise please wait a moment".

The private listings database 120 would thus contain a listing for Boulder Dental Care, and a link to the identified playback, which may be as simple as playing back the words "Boulder Dental Care" but which could be more elaborate, such as an ad for Boulder Dental Care. This listing was the one determined to be the most proximate to the user request, based on the highest bid among all advertisers and physical proximate location to the calling consumer. Note that the consumer has given the option to be connected to the indicated number or to continue listening for further information.

Assuming that the consumer does not press the # key within a predetermined period of time, the consumer will next hear S: "Avanti Dental Associates. We have your best smile in mind! If you would like to be connected to this listing press #, for more options press the * key."

At this point the consumer is being prompted with a listing that was of lower priority. For example, Avanti may be in Denver, further away from the consumer. Or Avanti may be in Boulder, and it may even be physically closer to the caller than Boulder Dental Care, but Avanti has not paid as much to the service provider for a higher priority listing.

In addition, according to other ways in which the system may operate, Avanti may not even have paid to be in the listings database 120. Rather, the Avanti listing may have been retrieved (due to result of a no match condition in the listing 120 search), from the publicly accessible business listings database of dental care providers in the Boulder, Colo. area.

The business database 190 may itself be a paid service to which the operator of application server 110 subscribes, or may be provided as the result of an automated internet search itself.

Continuing with the above example, if the consumer presses * in result in response to the prompt, she might hear the following:

S: "to move forward or back in the listings, press 1 for forward or 2 for back, to bookmark a listing so that it can be retrieved for further reference, press 3."

These options in the Interactive Voice Response system 106 allow the user to keep track of where they are in a list of multiple listings.

2. Key Word Search Supported by Advertising

As a further example of key word type searching, the consumer could have had an exchange as follows:

S: "What can I help you with?"
C: "I have a cavity."
S: "I thought you just said 'cavity', was that correct? If so press #".

At this point the application server 110 would then determine that 'cavity' is a keyword associated with the "Dentist" category or additional categories depending on information provided by the advertiser or algorithmically determined by the system. This can be done by server 110 keeping its own list of keyword/category matches or by lookup in the listings database 120. The server 110 then performs the search for a dentist as explained provided above and continue with the serving one or more ads.

The consumer may also be given a choice to be connected to a human operator. This could be when the IVR system hears the word "operator" in response to a prompt, or by the user pressing defined keys. At this the point a live operator may then assist with locating the desired services, with the same ad being played that would have been automatically provided had the user been able to use the IVR 106 successfully.

As another example, the user might have simply stated "I am looking for a good dentist" in the initial request. The IVR system may not have been able to discern the user's request and then automatically connected a human operator to help. The human operator would then initiate a query listing for dentists, by submitting the service search request for "Dentist" to the server, such as via a web text interface (not shown) allowing the system to then automatically provide a listing of dentists in the Boulder, Colo. area.

Figure 2A:
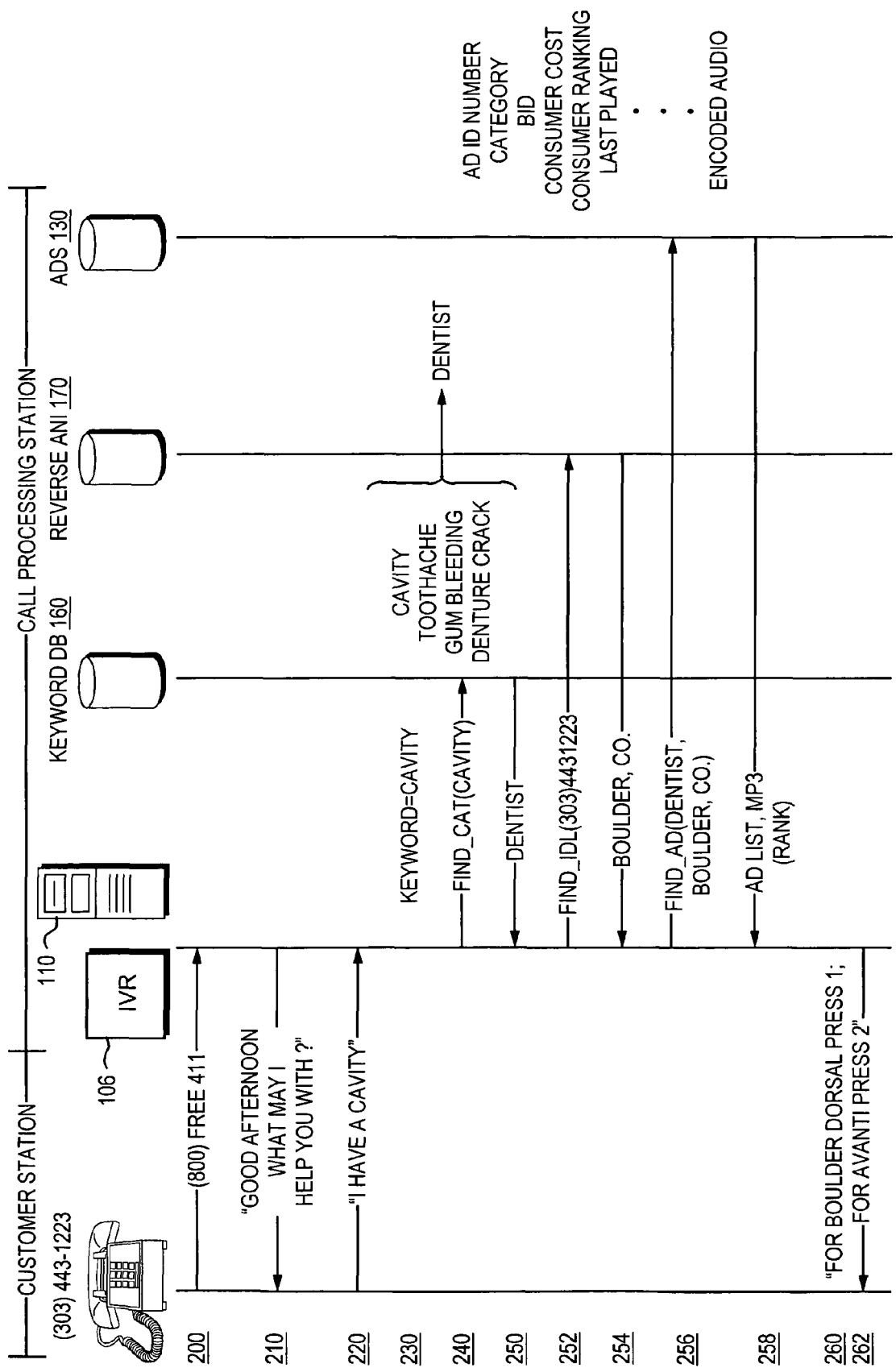
FIGS. 2A and 2B are flow charts of steps performed by the system to select an audio advertisement based on a geographic location associated with the consumer's request.

FIG. 2A illustrates an example of how a request may be processed by the system in more detail. Certain components of the system of FIG. 1 are listed across the top of the page, with a sequence of steps detailed beneath them. In this case the consumer request includes only keywords, and has not necessarily directly included a recognized business category as used in the listings database 120 (such as "Dentist").

Here, the consumer is using a telephone located in Boulder, Colo. having an assigned telephone number of 303-443-1223. In a first step 200, the consumer uses the telephone to dial the ad-supported information service, such as by dialing a toll-free 800 number.

After the call is connected, in step 210, the consumer hears:
S: "Good afternoon. What may I help you with?"
after which, in step 220, the consumer says:
C: "I have a cavity."

At this point, in step 230, the AVR 106 and/or application server 110 detect the key word "cavity" in the request, and also determine that it does not match a category in the listings 120 or business 190 databases. As a next step, a query
    find_category (cavity)
is thus made to the key word database 160. The query returns a category of "Dentist" in response to the query, in step 250. Note that several other key words and/or key phrases, such as "toothache", "gum bleeding", "denture crack", etc. are associated in the key word database 160 with "Dentist".

Having now determined an assigned category, the system can locate an advertisement. Beginning in step 252, a location for the consumer's telephone is determined in one of several ways. In the illustrated example in FIG. 2A, the location is determined from a find_location query in the reverse ANI database 170. The returned location is "Boulder, Colo.", in step 254. Note that a postal code can be used to identify a location with more specificity than a city name, in which case "80302" might be the United States Postal Service ZIP code associated with the address of the consumer's telephone 102.

Alternatively, as will be seen below, the consumer can be prompted with the IVR 106 to provide her location in response to a verbal question. In either event, the consumer's location is determined to be Boulder, Colo.

Next, one or more advertisements are determined from a query to the ad database 130:
    find_ad (Dentist; Boulder, Colo.)
in step 256, to return an advertisement for a dentist in Boulder. Note that more than one ad may be returned, in which case a step 260 must be performed. Step 260 can select from among multiple ads based on different criteria as desired by the service provider. This decision may be aided by additional information kept with each entry in the ad database 130.

For example, the entry may include, among other fields:

| | |
|---|---|
| category | the business category to which the ad relates |
| bid | the amount that the advertiser paid to place this ad |
| consumer cost | an estimate of how costly the advertised service or product is as compared to other similar products or services |
| cons. satisfaction | a ranking of how well consumers "like" the ad |
| last played | the time and date the ad was last used. |

In addition, data that represents the ad is stored in the database 130, or a link thereto. If the ad is stored as an audio file, it perhaps be stored as an .MP3, or .WAV file. If the ad is stored as a text file (to be processed by the text to speech, or to be read by a human operator, then other suitable text format files may be used to store the ad.

The ranking in step 260 might for example, select ads in a "round robin" fashion, such that the ad which was played the longest time ago will now be selected. Or the ranking in step 260 may select the ad for which the highest bid has been placed. Alternatively, step 206 may select the ad from the advertiser who is offering the "best deal" to the consumer; or perhaps if the ads have been ranked based on prior positive consumer satisfaction, that will enter into the ranking determination. A weighted combination of these criteria can also be used in selecting the ad to be played.

Finally, in step 262 we see the system has been programmed in this type of response to select two ads to be played, to give the consumer a choice. Here, both an ad for Boulder Dental and an ad for Avanti are played, with the Boulder Dental ad having scored higher in the ranking process and thus being played first.

Figure 2B:
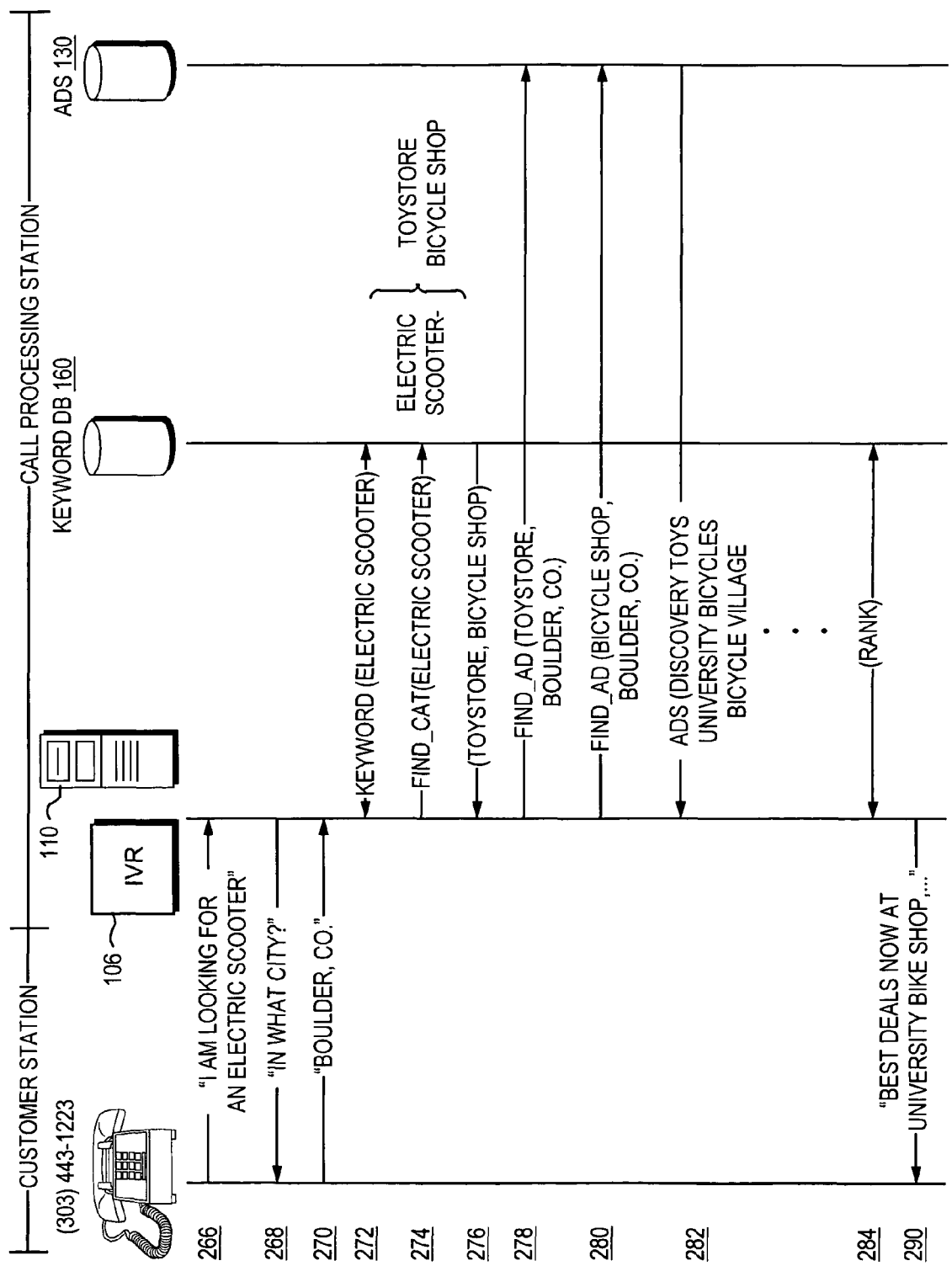

FIG. 2B shows a similar but slightly different type of entry in the key word database 160. In this example, the consumer is looking to purchase an electric scooter. Here is an example where the consumer specifies a key word, such as "electric scooter" in her initial request in step 266. Next, in step 268, the system prompts the consumer for her location. She response "Boulder, Colo." in step 270.

Next, in step 272, the key phrase is recognized, and then submitted as a query to the keyword database in step 274 as
   find_category (electric scooter)
which results in a list of two categories, "toy store" and "bicycle shop" to be returned. Each of the returned categories is then submitted to the ad database 130 in steps 278 and 280, to build a list of possible ads in step 282 that are associated with Boulder, Colo.

Step 284 then ranks the list of possible ads, as in the FIG. 2A example, to result in a selection being made from the list. Here, the "best deal to the consumer" is used as a rank, and an ad for the "University Bike Shop" is selected in step 290.

3. Advertising Supported Directory Information

The platform can also be used for providing advertising supported, directory information services. One example of such an exchange would be as follows:
S: "Please let me know the city and state please, and your request."
C: "Denver, Colo. Northwest Airlines."
S: "Please hold for that number".

This is what a typical user 102 would hear with prior art IVR based information listing services. However, the addition of server 110 allows the consumer at this point to hear an advertisement for a completely unrelated product, such as, for example, cooking oil. The cooking oil advertisement could be retrieved from advertisement database 130 randomly, or based on profiles 140. The user would then hear, after the advertisement,
S: "Your requested number for Northwest Airlines is 1-800-225-2525".

4. Advertising Supported Directory Information Using a Location Associated with the Response to Select an Ad.

The requested ad can often times be related to the search request or the response thereto. In the simplest example, a typical exchange could be as follows:
C: "I like the number for a nearby pizza place."
S: [Ad played for Foothills Pizza in Boulder, Colo. including the phone number.]

Here, the server 110 has simply selected a relevant ad based on the caller's location as determined by the reverse ANI database 170, matching the pizza category to a business in the listings database 120, and then selecting an ad from the ad database 130, ranking if multiple ads are returned, and then playing the highest ranked ad in response.

However, another exchange might be as follows:
C: "In Boulder, Colo. I am looking for Domino's Pizza".
S: "Please hold for that number".
"[Advertisement played for Pizza Hut]"
S: "Your requested number for Domino's Pizza in Boulder is 303-449-9080".
C: "If you'd rather be connected to our sponsored advertiser press 1, otherwise if you would like to be connected to your listing press 2."

In the above example, an advertisement is played for competing service provider in response to a request for a specific listing category. It is envisioned that users would not mind engaging in such an exchange, since they would not be charged for the call to directory assistance that they would otherwise have to pay for.

In the above example, the advertiser, Pizza Hut, would be charged a fee, who presumably does not paying for the lead to a customer who is ready to order a pizza.

Figure 3:
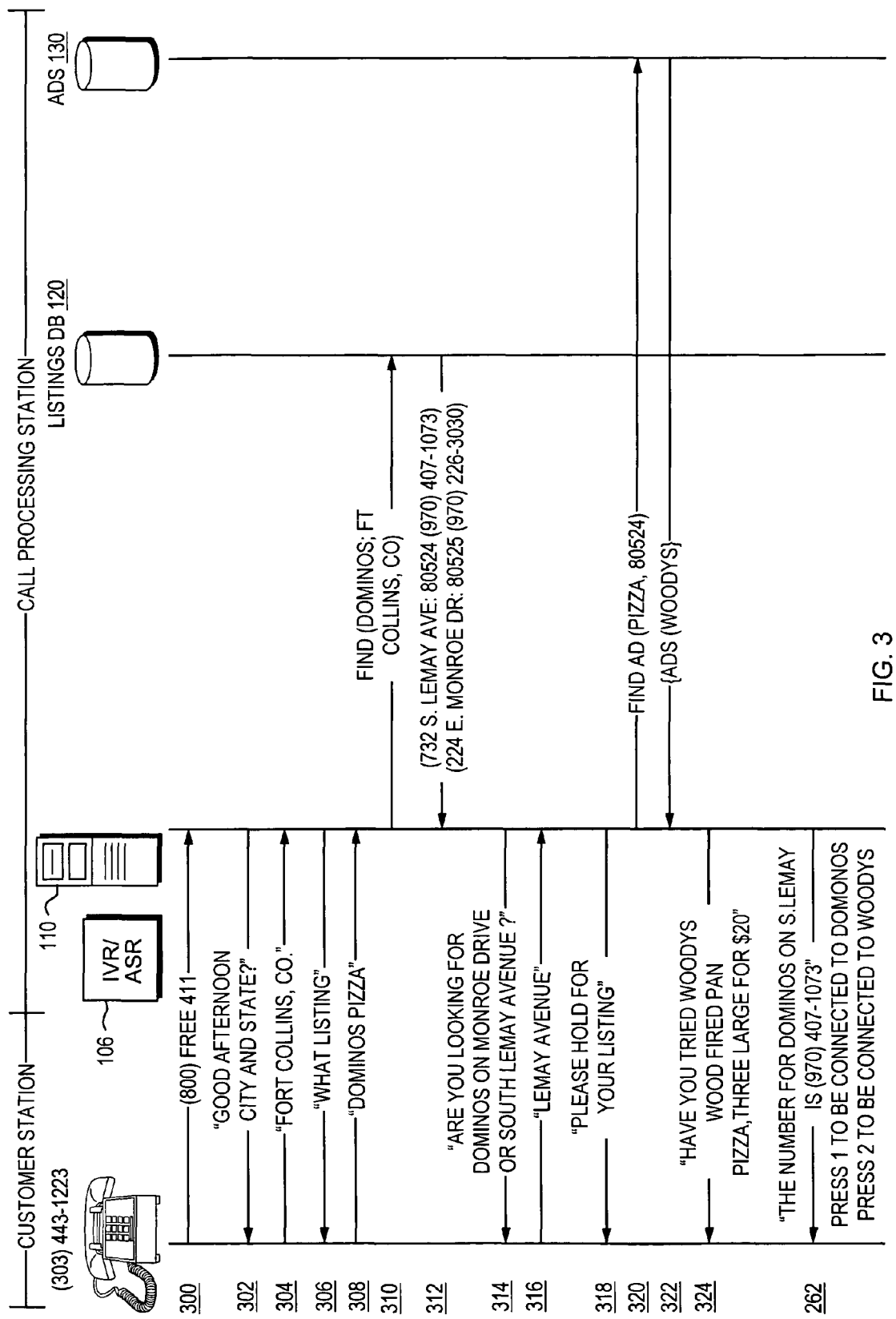
FIG. 3 is a flow chart of steps performed by the system to select an audio advertisement based on past history of the consumer's prior request.

Another technique for selecting an ad, but based on the result of the request for information, is illustrated in FIG. 3. Here, after the initial step of connecting the consumer to the system in step 300, the verbal exchange begins in steps 302 through 308 as follows:
S: "Good afternoon. City and state please?"
C: "Fort Collins, Colo."
S: "What listing?"
C: "Dominos Pizza"

Recall that the consumer is located in Boulder, Colo. but here is seeking a listing in Fort Collins—perhaps they are planning to travel there later in the evening for dinner.

Here, a query is first made to the listing database 120 in step 310:
   find_listing (Dominos Pizza; Fort Collins, Colo.)
but returns two listings in step 312
   732 South Lemay Ave.; Fort Collins, Colo.; 80524 970-407-1073
   224 Monroe Drive; Fort Collins, Colo.; 80525 970-226-3030
requiring the system in step 314 to prompt the consumer to chose in step 316:
S: "Are you looking for the one on South Lemay Avenue or Monroe Drive?"
C: "Lemay Avenue"
S: "Please hold for your listing."

At this point the system can insert an ad based on the results of the consumer's request, (as opposed to the location of the consumer's phone). By looking at the results for Domino's on South Lemay Ave., a ZIP code of "80524" is identified. Thus, the subsequent query to the ads database 130 can take the form of:
   find_ad (pizza, 80524)
which is thus local to the particular geographic area in which the consumer is interested. As noted previously, postal or ZIP codes provide a convenient way to define geographic areas more precisely than city names, although there are other ways. For example, in step 314, the listings database might also return a latitude and longitude for 732 South Lemay Avenue as 40.54 N-105.07 W. This then permits the query to the ads database to optionally take the form of:
   find_ad (pizza; 40.54 N-105.07 W; radius=5 miles)
which may then return an ad relevant to an area surrounding the object of the consumer's request.

In any event, the ads database query returns an ad (and any necessary ranking process as described in FIG. 2A might be used, although not shown in FIG. 3) for "Woody's", and it is played in step 324:
S: "Have you tried the '2 large for $10' deal at Woody's? Rated #1 best pizza in Fort Collins four years running."

Finally, in step 326, the consumer may be given their number and prompted to select from the requested listing or the advertised listing:
S: "The number for Domino's on South Lemay Avenue is 970-407-1073.
If you would like to be connected to your requested listing, press 1.
If you would like to be connected to Woody's, press 2."
which allows the user to not only have a chance to receive information supported by advertising, but also allows the user, after being informed of an alternative choice, interact with the system, to select a desired product or service provider. Note here that the ad was selected based on determining a location associated with the response to the request, and not necessarily to the request itself, as a possibly more relevant criteria for ad selection.

5. Call Completion that is "Free" to Consumers

The example of FIG. 3 also illustrated another service provided by the system, a sponsored call completion service. It is common for consumers to have access to information services that provide automatic connection to directory listings. These types of services, however, typically charge the consumer a small amount such as $1.00 for making such connections automatically.

The system provides the ability to provide such services wherein the cost is supported by an advertiser. In a simple example, an exchange can be as follows:

C: "Boulder, Colo., Dominos Pizza."
S: "Just a moment. If you would like to be connected to your listing without charge, please hold for a message from our sponsor."
C: [Ad played for cooking oil or a competing pizza supplier].

The specific ad for cooking oil is selected in a manner similar to the ad selections already described. In the "play any ad" case, the ad might typically be selected by highest bid or round robin selection. The "cost" for the consumer to obtain the information is thus the need for her to first hear the ad.

In this example, the request could of course also be made for a residential listing for example, with a random or demographic ad picked from the listings database 120.

6. Ad Selection Based on Past History of Requests or Responses.

As explained above, the criteria for determining which ad to play in response to a request can be based on a number of factors. It can be based upon the request itself, i.e., the particular category or keyword associated with a request, as described in connection with FIGS. 2A and 2B. Or it can be based on the response to the request, as described in the example of FIG. 3.

However, further criteria can be associated with previous requests from the same phone number. Thus, if multiple advertisers have paid for listings 120 in given location, it may be desirable to not have the same caller hear the same advertiser each time. Thus data can be maintained in a profiles database 140, to allow the system to recall which ads had previously been played to the same phone 102.

Figure 4:
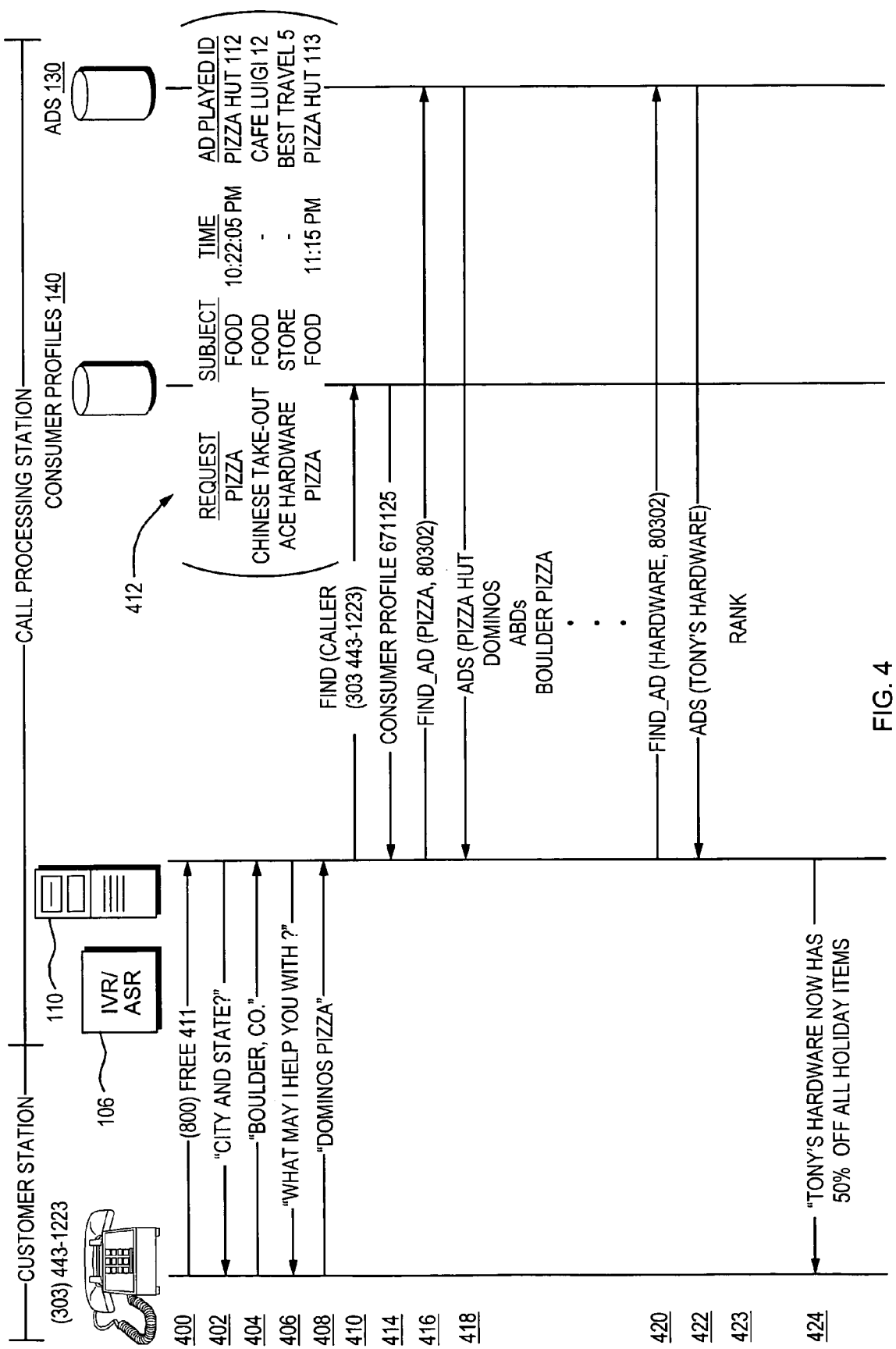
FIG. 4 is a flow chart of steps performed by the system to select an audio advertisement in response to a key word specified by the consumer.

One example is shown in FIG. 4. After the call connection is made in step 400, the initial verbal exchange is as follows (steps 402-408):

S: "City and state?"
C: "Boulder, Colo."
S: "What may I help you with?"
C: "I am looking for a number for Dominos Pizza."

In step 410, the system here can read the caller ID information to determine that the consumer's telephone number is 303-443-1223. The number is then used in step 410 to perform a query of the consumer profiles database 140:

find_caller (303-443-1223)

which in step 414 returns a consumer profile for the calling telephone. As was described above, the databases may associate more than one telephone (e.g., a home phone, an office phone, and a mobile phone) with the same consumer. A typical consumer profile may also contain several entries, such as the consumer's name and address with ZIP code, and a number of profile entries, with each entry being a record of a past interaction with the system. A record may contain items such as request a keyword or other identifier of the request that was made (e.g., "pizza")
    subject a subject matter category associated with the request (e.g., "take out food")
    time the date, day of the week, and time the request was made ad played an identification of the ad that was played Similar to previously described functions, this permits the system, in step 416, to locate ads associated with the consumer's request and her calling telephone's location based on ZIP code:

find_ad (pizza, 80302)

which might return ads for Pizza Hut, Dominos, Abo's, and Boulder Pizza. But, given the history of past requests, the system can also find ads for "hardware stores", which the caller has apparently been recently interested in:

find_ad (hardware, 80302)

in steps 420 and 422.

In this example, the system might chose an ad for "Tony's Hardware", based on the particular past interest, but may also do more sophisticated things. For example, the ad selection process may see that multiple ads for Pizza Hut have been played in the past, but that the consumer is still asking for Dominos. Apparently, then the Pizza Hut ads have not worked, and the system might thus select another ad, such as for Tony's Hardware, in an attempt to influence the consumer.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for providing directory assistance information in a public telecommunications network accessed by a toll free number, the method comprising the steps of:
    at a call processing station,
    (a) receiving a request for information from a customer station;
    (b) determining by the call processing station, a response to the request for information;
    (c) examining the response to determine a geographic location associated with the response;
    (d) automatically determining a selected advertisement associated with the geographic location and a category associated with the request for information; and
    (e) retrieving the selected advertisement from a stored media.

2. A method as in claim 1 wherein step (d) further comprises:
    querying a database to determine the selected advertisement, the step of querying a database using as query parameters the geographic location as determined from the step of examining the response and the category associated with the request.

3. A method as in claim 1 wherein step (c) further comprises a step of:
    determining the geographic location of step (c) from a telephone number associated with the response.

4. A method as in claim 1 wherein step (d) determines that multiple advertisements are associated with the geographic location determined in step (c), and further comprising the step of:
    automatically determining a selected advertisement from among the multiple advertisements associated with the geographic location in the response.

5. A method as in claim 4 wherein the step of automatically determining a selected advertisement is based on determining the advertisement having an associated geographic location that is closest to the geographic location of the response.

6. A method as in claim 4 wherein the step of automatically determining a selected advertisement is based on maximizing advertising revenue.

7. A method as in claim 6 wherein maximizing advertising revenue further chooses the advertisement for which the advertiser has indicated by way of a bid that they are willing to pay more than any other advertiser to play their associated message to the customer station.

8. A method as in claim 4 wherein the step of automatically determining a selected advertisement is based on maximizing consumer satisfaction.

9. A method as in claim 4 wherein the step of automatically determining a selected advertisement uses a round robin selection.

10. A method as in claim 4 wherein the step of automatically determining a selected advertisement is based on determining a best offer to the customer station.

11. A method as in claim 1 wherein the geographic location is determined as a latitude and longitude associated with the response.

12. A method as in claim 1 wherein the geographic location is determined as an address associated with the response.

13. A method as in claim 1 wherein the geographic location is specified as a geographic area.

14. A method as in claim 13 wherein the geographic area comprises a location and a specified radius around the location.

15. A method as in claim 13 wherein the geographic area comprises one of a city, county, state, or country designation.

16. A method as in claim 1 wherein the geographic area is defined by postal code.

17. A method as in claim 1 additionally comprising:
(f) forwarding the selected advertisement to the customer station.

18. A method as in claim 17 additionally comprising a step of:
(g) causing the advertisement to be played to the customer station in an audible form.

19. A method as in claim 17 additionally comprising a step of:
(h) causing the advertisement to be played to the customer station in a visual form.

20. A method as in claim 17 wherein the forwarding is performed by an operator reading the selected advertisement aloud.

21. A method as in claim 1 wherein the request for information includes a name of a business.

22. A method as in claim 1 wherein the request for information includes a type of business.

23. A method as in claim 1 wherein the request for information includes a description of a product or service.

24. A method as in claim 1 wherein the request for information includes a description of at least one of a city or state.

25. A method as in claim 1 wherein step (c) further comprises a step of:
determining the geographic location of step (c) from emergency information regarding the customer station.

* * * * *